United States Patent [19]

Kumar et al.

[11] Patent Number: 4,813,044
[45] Date of Patent: Mar. 14, 1989

[54] METHOD AND APPARATUS FOR DETECTING TRANSIENT ERRORS

[75] Inventors: Manoj Kumar, Crompond; Ambuj Goyal, Amawalk; Bharat D. Rathi, Mahopac, all of N.Y.

[73] Assignee: International Business Machines Corporation, Armonk, N.Y.

[21] Appl. No.: 9,166

[22] Filed: Jan. 30, 1987

[51] Int. Cl.$^4$ ............................................. H03K 13/32
[52] U.S. Cl. ......................................... 371/55; 371/49; 371/52
[58] Field of Search .................... 371/49, 50, 51, 55, 371/57, 52

[56] References Cited

U.S. PATENT DOCUMENTS

| | | | |
|---|---|---|---|
| 3,576,952 | 5/1971 | Van Dunren | 371/49 |
| 4,006,455 | 2/1977 | Hamilton | 371/55 |
| 4,134,103 | 1/1979 | Huxtable | 371/52 |
| 4,498,177 | 2/1985 | Larson | 371/52 |
| 4,502,143 | 2/1985 | Kato | 371/57 |
| 4,554,665 | 11/1985 | Beesley | 371/55 |
| 4,581,741 | 4/1986 | Huffman | 371/57 |

Primary Examiner—Michael R. Fleming
Attorney, Agent, or Firm—Terry J. Ilardi

[57] ABSTRACT

A method and apparatus used to detect errors in a signal transmitted over a single wire. All transient errors are detected when the effect of the transient lasts for at least one cycle and not more than five cycles. Transient errors of longer duration will be detected if the level of the original signal at the start of the transient is different from that at the end of the transient. Stuck faults will be deleted if one onset of the stuck fault causes the level of the signal to change. Redundancy is incorporated by introducing redundant transitions in the signal on the same wire. This requires the successive transitions in the original signal to be at least three cycles apart. If a transition is viewed as a binary one and the absence of a transition as a binary zero then each binary one is replaced with the sequence "one-one-one" (overwriting subsequent zeros), and keeping each zero as the single bit "zero". Upon decoding, each group of three transitions is converted to a single transition. Signals having more than or less than three consecutive transitions which are not in multiples of three are determined to be in error.

9 Claims, 5 Drawing Sheets

METHOD AND APPARATUS FOR DETECTING TRANSIENT ERRORS

BACKGROUND OF THE INVENTION

1. Field of the invention

The present invention relates to communication between electronic devices and more particularly to a method and apparatus for detecting errors in the transmission of digital data.

2. Background of the Invention

In large digital systems, the authenticity of signals which convey the status of one subsystem to another is particularly important for error free operation of the system. Noise is often introduced into digital computer environments both from external sources as well as from switching transients that may occur within a digital device. Similarly, noise is often introduced into telecommunication lines, such noise often being environmentally produced, either by man or nature. In digital systems in particular, such noise may be interpreted as data or instructions and may lead to incorrect results or catastrophic failure of the system. It is therefore important to be able to verify that a transmitted signal has in fact been correctly received.

At least three types of circuits and methods have been used in the prior art to ascertain that a signal has been accurately transmitted. In one method, the signal which needs to be verified is transmitted over two wires instead of only one wire. Thus a simple comparison of both signals at the receiving end can be made. If the received signals differ an error in transmission has occurred and appropriate corrective action can be implemented.

Oftentimes a given system will tend to pull a signal one way or the other. That is, it may tend to favor the introduction of errors that for example, make signals logical 0 when in fact the signal should be logical 1, or vice versa. Such systems can be compensated for in an enhancement to the basic two wire system by taking the signal it is wished to transmit, and transmitting in parallel with it, an inverted version of the signal. Both such systems require the use of an additional line for the transmission of the extra signal.

Another method known in the art is the transmission of a parity signal, which is used when several signals are transmitted from one device to another. The bits of these signals can be added to generate a parity signal corresponding to whether the bits add up to an odd or even number, and the parity signal transmitted along with the signals it is desired to verify. If an odd number of these signals are in error, the transmission error can be detected. This also often requires use of a separate dedicated line for transmission of the parity bit or signal.

Packaging constraints often prevent the use of conventional error detection/correction schemes (such as parity lines), because these schemes require additional wires to incorporate redundancy and there is often simply no room available for this purpose.

In the third type of error checking devices, only a single wire is used but additional error codes are added. In these systems, a data stream is divided into a sequential series of periodic time slices. An error checking code is added to the data within each time slice, which is transmitted along with the original data. This requires a faster transmission rate for the encoded signal to accommodate the added information.

These systems have the inherent disadvantage of degrading the performance of the system in which they are incorporated. For example, in systems where the data remains stable over periods of time that are long relative to the period of the time slice, even though there is no transition of data, a new signal must be sent for each time slice with the code added to it. Thus, circuitry time and overhead must be devoted to such an error checking signal even when the system has no need for error checking.

Furthermore, such systems are not truly asynchronous since both the receiver and transmitter must be set to the same time slice. Additionally, the selection of the length of the time slice is usually constrained.

In U.S. Pat. No. 4,020,282, entitled HIGH DENSITY DATA PROCESSING SYSTEM, a data processing system applicable to high density magnetic recording and data transmission wherein digital data is translated into multi-level zero average words which occupy a greater number of time slots than the bits of the digital data which they represent, is described. The words having increased power density in the signal spectra represent the difference between different words. After recording or transmission, the signals are detected and decoded in accordance with the amplitude characteristics of samples of the detected signals occurring during time slots which are occupied by samples, the sum of which is equal to zero. More particularly, the system converts every four bit binary number into a sequence of 6 bits having equal number of ones and zeros.

In U.S. Pat. No. 4,007,421, entitled CIRCUIT FOR ENCODING AN ASYNCHRONOUS BINARY SIGNAL INTO A SYNCHRONOUS CODED SIGNAL, a system is described in which each asynchronous transition is encoded into a two bit binary code. Successive intervals of an asynchronous binary signal are examined for the occurrence of transitions and each transition is encoded into a two bit binary code word. The occurrence of two transitions within a predetermined interval of time indicates that the asynchronous signal is distorted. A first code word is generated in response to the first transition to indicate to remote decoding apparatus the occurrence of the first transition within the interval of actual occurrence. A second code word is generated in response to the second transition to indicate to the remote decoding apparatus the occurrence of the second transition in an interval immediately subsequent to the interval in which the second transition actually occurred. Polarity information is periodically transmitted to the decoding apparatus to ensure that the polarity of the asynchronous signal reproduced by the decoding apparatus is the same as the polarity of the original asynchronous signal.

In U.S. Pat. No. 3,938,085, entitled TRANSMITTING STATION AND RECEIVING STATION FOR OPERATING WITH A SYSTEMATIC RECURRENT CODE, a transmitting station is described which comprises coding means, including a shift register having L stages, where L is the length of the code, for delivering continuation and repetition bit trains, each of which comprises information bits including at least L message bits as well as the parity bits associated with the information bits. In the case of a continuation bit train, the L message bits are supplied by a data source, in the case of a repetition bit train, they are fed back to the coding means from the shift register. In the receiving station, the decoding of messages bits is a conventional decoding in accordance with the code where a continuation bit train is concerned, but also takes into account the previously decoded value where a repetition bit train is concerned. The trains may be identified by means of prefixes of $N_1$ bits, in which case, each bit train comprises $(N_1+L)$ information bits.

In U.S. Pat. No. 3,909,784 issued Sept. 30, 1975 to Raymond et al., entitled INFORMATION CODING WITH ERROR TOLERANT CODE, information is expressed in the form of pulses which are arranged in accordance with the equation: $M_n = xn + T$ where n is the code number, M is the quantity of pulses per code number, T is the negative tolerance of pulse count, and x is the sum of one pulse the positive tolerance and the negative tolerance of pulse count. The redundant pulses are added in order to withstand loss of T pulses or gain of $x-1$ pulses.

SUMMARY OF THE INVENTION

The present invention describes a method and apparatus which is used to detect errors in a signal transmitted over a single wire. All transient errors are detected when the effect of the transient lasts for not more than five cycles. Transient errors of longer duration will be detected if the level of the original signal at the start of the transient is different from that at the end of the transient. Stuck faults will be deleted if the onset of the stuck fault causes the level of the signal to change.

In the invention, instead of using additional wires, redundancy is incorporated by introducing redundant transitions in the signal on the same wire. This requires the successive transitions in the original signal to be at least three cycles apart.

If a transition is viewed as a binary "one", and the absence of a transition as a binary "zero", then the invention consists of replacing each binary one with the sequence "one-one-one" (overwriting two subsequent zeros), and keeping each zero as the single bit "zero". The proposed invention thus falls in the category of systems that provide error detection capability by translating the input code words (single bit) to longer code words (three bits).

It is thus an object of the invention to provide a method and apparatus for error checking that does not require use of an additional line for redundancy.

It is another object of the invention to provide a fully asynchronous error checking system.

It is yet another object of the invention to provide an error checking system dependent upon transitions.

It is still a further object of the invention to encode the signal only when transitions occur and not periodically.

These and other objects, features and advantages of the invention will become more apparent upon reference to the detailed description of the preferred embodiments and the annexed drawings.

DETAILED DESCRIPTION OF THE PREFERRED EMBODIMENTS

Figure 1:
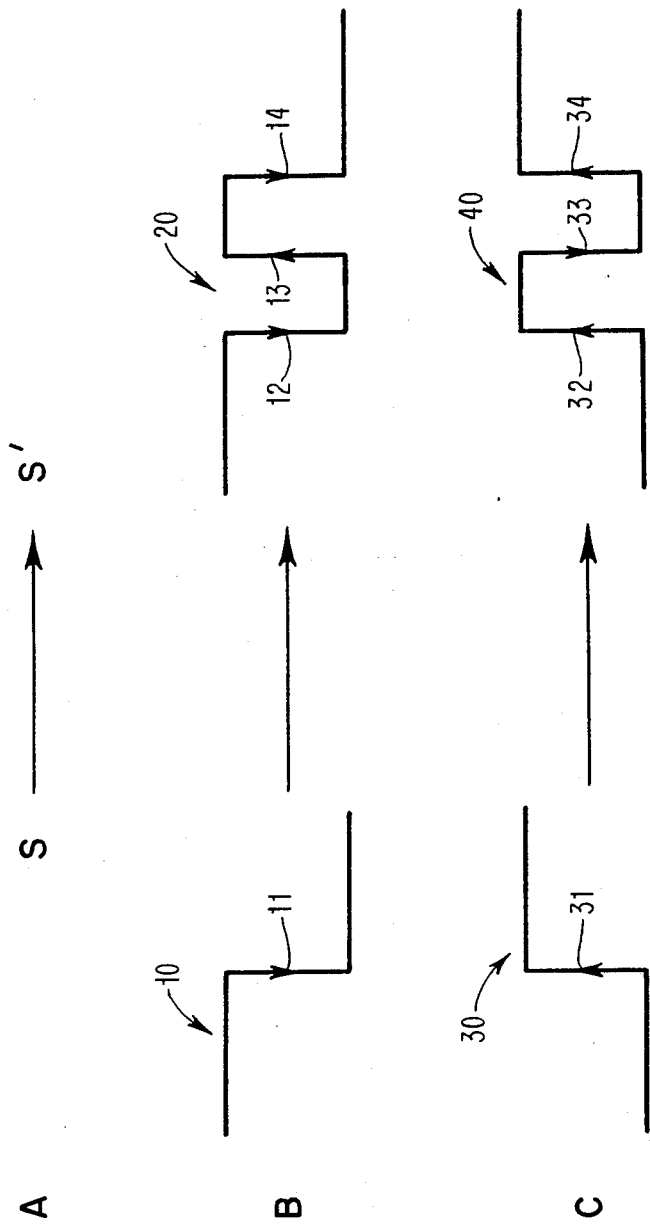
FIGS. 1a-1c are a diagram showing transformation of an unencoded signal into an encoded signal, and vice versa.

In the method and apparatus according to the present invention, a signal to be transmitted from a first device is encoded using a redundancy in time technique. As shown in FIG. 1, the original signal S is used to generate a new signal S'. The redundancy in time technique adopted in the present invention, generates two additional logical transitions in the output (encoded) signal S' for every one logical transition in the original or input signal. The transitions described are changes between a logical 1 and a logical 0 state as occur in virtually all digital electronic circuitry. Essentially every transition on S is reflected into three successive transitions on S'.

Although a one to three transition ratio is discussed for general purposes, other ratios may be selected and may be useful under specific circumstances. Odd ratios allow the final logic levels in the original signal S, and the transmitted signal S' to be the same. Thus, using a three to one redundancy ratio, if the transition of the original signal was down-up, the final transition of the encoded signal will also be down-up. This will be true of any odd ratio. Even ratios, however, may also be used, as long as the decoding circuitry is properly adapted to decode them.

Referring now to FIG. 1, representation B, input signal S shown as waveform 10, has a single up down transition 11. At the output S', waveform 10 has been converted to waveform 20 having three transitions, namely up-down transition 12, down-up transition, 13 and up-down transition 14. Referring to representation C, a single down-up transition 31 in the original S signal 30 is transformed into a series of three transitions including down-up transition 32, up-down transition 33, and down-up transition 34 as part of the new S' waveform 40.

Figure 2:
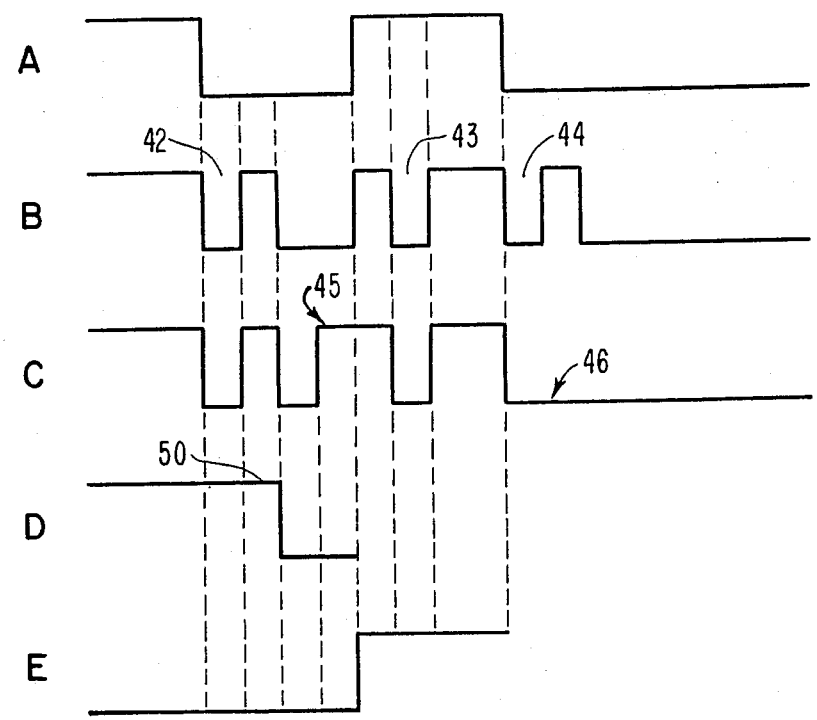
FIGS. 2a-2e show waveforms useful in explaining the present invention.

FIG. 2 shows waveform A which is a signal without noise. Waveform B shows the signal of waveform A after encoding, in which single transitions have been replaced with three transitions at 42, 43, and 44. Waveform C shows waveform B plus transmission errors at 45 and 46. Finally, waveform D shows the signal that is decoded by the present invention. It will be noted in waveform D, at 50, there is no further attempt decode the noise, but rather, a separate error signal E is generated, which signal can be used to trigger other circuitry that can attempt to reconstruct the signal or, effect its retransmission.

The circuitry of the present invention can be operated either synchronously or asynchronously, depending upon the needs and capabilities of the system. In asynchronous operation, the circuits need some type of synchronizing protocol as used, for example, in UARTs. In such a case the clock or sampling frequency will be approximately 4 to 8 times the frequency at which the data is sent.

In synchronous systems the clock rate will be at the same rate as the transitions of the data. Thus, as will be clear from the following, in a synchronous system the clocked inputs in the encoding and decoding circuitry will be tied to the system clock.

Figure 3:
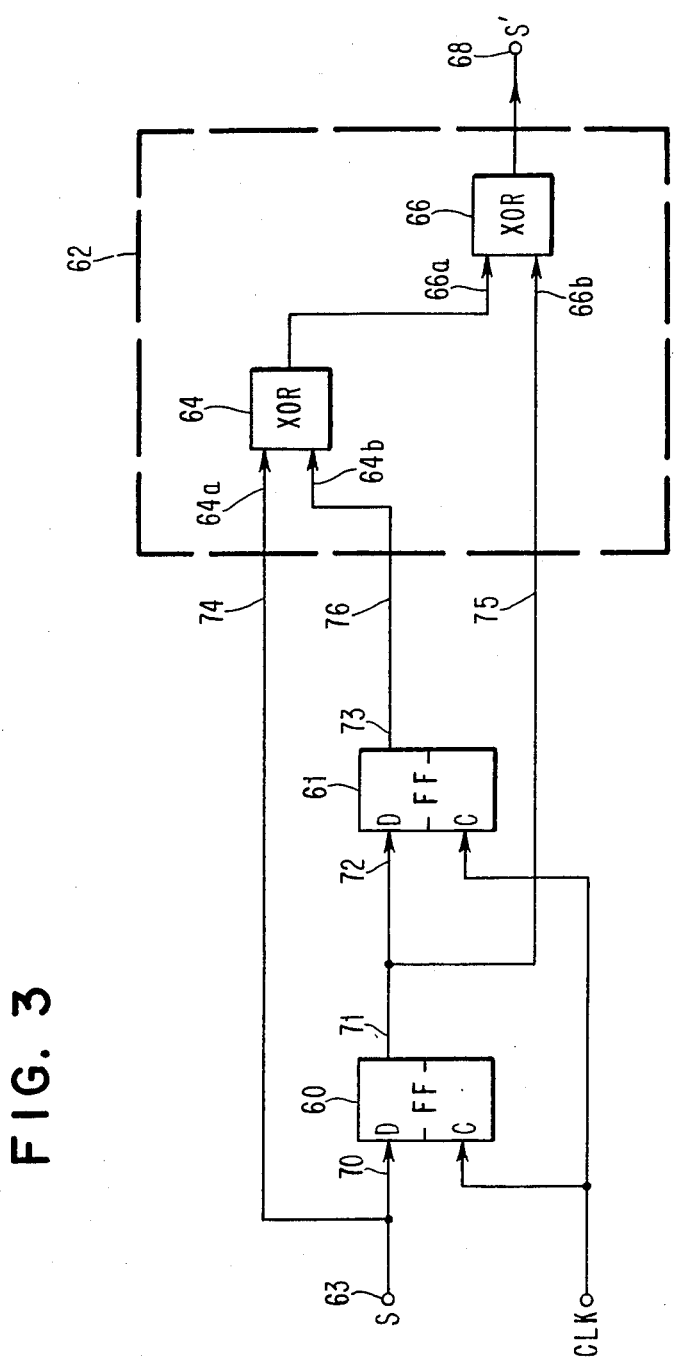
FIG. 3 is a schematic representation of a circuit useful for generating an encoded signal.

A circuit to generate S' from S is shown in FIG. 3. It will be recognized by those of skill in the art that other circuits can be developed that will also generate the tripley redundant encoded signal required by the present invention.

This circuit includes three basic elements, namely delay circuits 60 and 61 and even parity circuit 62. As shown delay circuits 60 and 61 are comprised of D type flip-flops. The D type flip-flops function such that on every clock pulse the signal presented to their D inputs 70 and 72, is transferred to their outputs 71 and 73. The two signals are presented on leads 75 and 76 respectively, together with the original signal on lead 74 to even parity circuit 62. This circuit 62 includes exclusive OR gates 64 and 66.

In operation flip-flops 60 and 61 are initialized to the initial value of S. The pulse or transition on S to be encoded is received at terminal 63 and coupled to input 64a of exclusive OR gate 64, and to input 70 of D-type flip-flop 60. For purposes of explanation it is assumed that initially S is 0.

With the presence of a 0 to 1 transition at input 63, the output of exclusive OR gate 64 will go high, and thus force the output of exclusive OR gate 68 to also go high, to present the first transition (in this case 0 to 1) at terminal 68.

Upon the receipt of a clock input at the C inputs of flip-flops 60 and 61 respectively, the 1 at the input 70 of flip-flop 60 will be transferred to its output 71, and to the input 72 of flip-flop 61 and input 66b of exclusive or gate 66. The presence of the additional 1 at input 66b together with the already existing 1 a input 66a of exclusive OR gate 66, will cause its output to go low, and cause a 1 to 0 transition at 68, to thus achieve the second transition.

On the next clock pulse received at the C terminals of flip-flops 60 and 61 the 1 at input 72 of flip-flop 61 will be transferred to its output 73, and to input 64b of exclusive OR gate 64, which will, due to the presence of the previously discussed 1 at its input 64a, generate a 0 at its output. This in turn is coupled to input 66a of exclusive OR gate 66, which still having a 1 at its 66b input will now output a 1, to cause another 0 to 1 transition. Thus one 0 to 1 transition on S will have generated a total of three transitions, i.e. a 0 to 1, 1 to 0, and 0 to 1, on S', in that order. It will be noted that a further clock pulse while S remains high, will not generate another transition since the output state of flip-flops 60 and 61 will not change.

Figure 4:
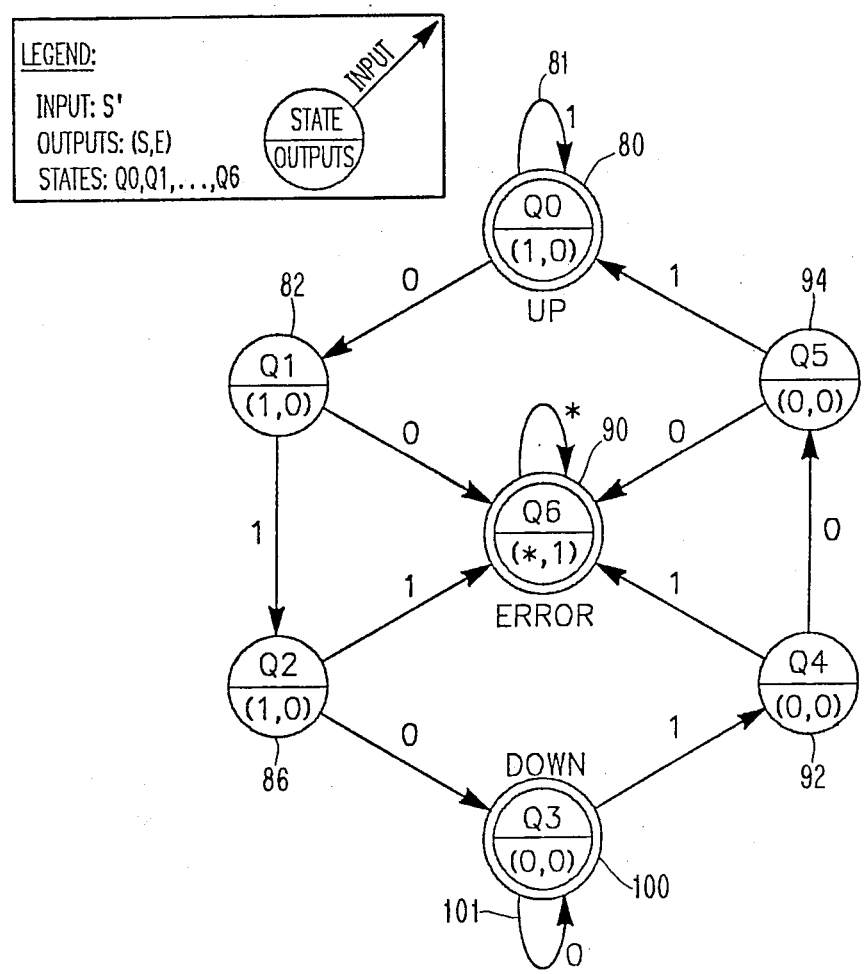
FIG. 4 is a state diagram showing the states and transition of the decoding hardware.

The finite state machine, described by the state diagram of FIG. 4, can be used to recover the S signal from an encoded S' signal if S' has not been altered by noise and to produce an error signal otherwise. The finite state machine does not perform a recovery function but generates the error signal E so that other circuitry can attempt to recover the signal, for example by transmitting it again.

The finite state machine is initialized to the Q0 state at 80 and S' is initialized to 1 if the initial value of S is 1. The finite state machine is initialized to the down Q3 state and S' is initialized to 0 at 100 if the initial value of S is 0. The recovered value of S is 1 in the Q0 state (80) and the two non error states are reachable from there. The recovered value of S is 0 in the Q3 state (100) and the two non error states are also reachable from there.

FIG. 4 can be explained as follows. Assuming that the finite state machine is initialized at 80 (Q0), if it receives another 1, it loops back to 80 via loop 81. If a 0 transition is received, it then changes to state Q1 at 82. If the next level received is a 0, an error is returned, since this means there has been a single transition instead of the three that are indicative of error free transmission. Errors go to state Q6 at 90.

If instead, a transition to 1 is received at Q1, there is as yet no error and the state is shifted to Q2 at 86 where the next signal is tested. If a 1 is received, meaning there is no transition, and the signal remains in the up state, then the state shifts to Q6 (90). If however, a transition to 0 is received, the state shifts to Q3 (100), which returns an output (decoded signal at level 0) 0 and an error signal at level 0. Thus three transitions, namely a one to zero (up-down), zero to one (down-up) and another 1 to zero (up-down) results in generation of a single one to zero output transition.

If, however, the FSM is initialized to 0 (i.e. state Q0 (80)), meaning a 0 is input, or if the FSM started at 1 as described above and is now at state Q3 at 100, and if it receives another 0, then it loops back to 100 via loop 101. If a 0 to 1 transition is received, i then changes to state Q4 at 92. If the input signal level stays at 1, an error is returned, since this means there has been a single transition instead of the three that are indicative of error free transmission. Errors go to state Q6 at 90.

If instead, a transition to 0 is received in state Q4, there is as yet no error and the state is shifted to state Q5 at 94 where the next signal is tested. If a 0 is received, meaning there is no transition, i.e. the input signal remains in the down state, then the state shifts to error state Q6 (90). If however, a transition to 1 is received, then transition is made to Q0 (80). In this instance, a 1 is generated as an output, yielding the desired up transition. Thus three transitions, namely a zero to one (down-up), one to zero (up-down) and another zero to one (down-up) results in the generation of a single zero to one output transition to reconstruct the original signal.

Figure 5:
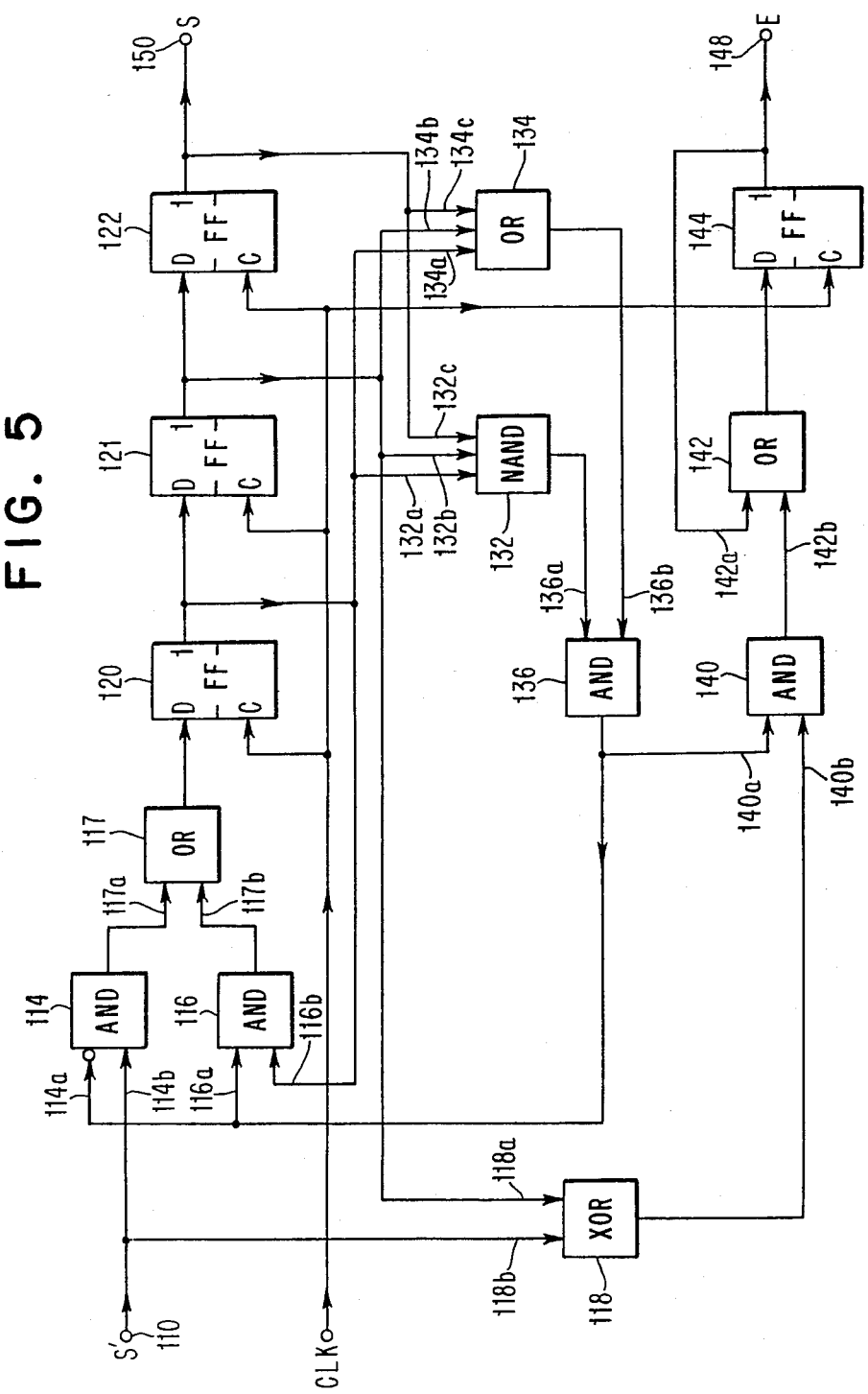
FIG. 5 is a schematic representation of a circuit for decoding an encoded signal and for detecting errors.

A finite state machine such as that shown in FIG. 4 can be used to generate a circuit using standard techniques. One such circuit is shown in FIG. 5. It should be noted however, that depending on the technology in which the redundancy generation and checking circuits are being implemented, different circuits can be designed to perform the same function with less and/or different logic.

Refer now to FIG. 5 in which is shown a circuit to recover S from S' according to the finite state machine of FIG. 4.

The circuit of FIG. 5 performs two functions, (1) it generates an error signal when an error has occurred, and (2) decodes a tripley redundant S' signal to produce S.

Decoding takes place essentially through D-type flip-flops 120, 121 and 122.

In the following explanation it is assumed that at power on S' is at 0 and flip-flops 120, 121 and 122 have logical 0's at their D inputs and at their outputs.

Assume initially a 0 is present at input terminal 110, which provides a logical 0 to AND gate 114 and XOR gate 118. Since flip-flops 120, 121 and 122 have 0's at their outputs, logical 0's are presented to inputs 116b of AND gate 116, 132a, 132b and 132c of NAND gate 132 and 134a, 134b, and 134c of OR gate 134.

NAND gate 132 thus produces a 1 at its output. OR gate 134 produces a 0 at its output, and AND gate 136 consequently produces a 0 at its output. This 0 is coupled to inverting input 114a on AND gate 114 and input 116a of AND gate 116. AND gate 114 thus produces a 0 at its output and AND gate 116 produces a 0. These signals are ORed by OR gate 117, which produces a 0 at its output. The signal at output terminal 150 remains 0, and also remains 0 on subsequent clockings since 0's at the input of the flip-flops 120, 121, and 122 will simply be transferred to output 150 in bucket brigade fashion.

Similarly, the error detection circuitry comprised of XOR gate 118, AND gate 140, OR gate 142 and flip-flop 144 will present a 0 to output 148 indicating that there is no error. AND gate 140 will have two 0's at its input to present a 0 to the input of OR gate 142. OR gate 142 also receives a 0 via a feedback loop from the output of flip-flop 144 which is assumed to have 0's at its input terminal and output terminal at power on. Thus the error circuitry also stably produces 0's until erroneous transitions occur in S'.

On a first zero to one transition in S', input 114b of AND gate 114 goes to one as does its output. The output of OR gate 117 thus goes to 1 to present a 1 to the input of flip-flop 120. Similarly, XOR gate 118 receives a 1 but the output of AND gate 140 remains at 0. It is assumed that the transitions occur on the system clock. When the system is clocked at the C inputs of flip-flops 120, 121, 122 and 144 a 1 is clocked to the output of flip-flop 120 and in turn to input 116b of AND gate 116, input 132a of NAND gate 132 and input 134a of OR gate 134. NAND gate 132 and OR gate 134 thus both produce 1's which are ANDed in AND gate 136. This signal is in turn applied to inverting input 114a of AND gate 114 and input 116a of AND gate 116, which produce a 0 and 1, respectively. A 1 is thus produced at the output of OR gate 117.

If the input S' remains at one after the above clock, this indicates that a one to zero transition did not follow the previous zero to one transition. In this case, in the error detection circuitry, exclusive OR gate 118 receives a 1 and a 0 and thus outputs a 1. AND gate 140 now receives two 1's to produce a 1 at its output, and consequently so does OR gate 142. The output at 144 thus changes to 1 at the next clock pulse, and stays at that level until flip-flop 144 is explicitly cleared.

On the next clock pulse, the 1 at the output of flip-flop 120 is transferred to the output of flip-flop 121 and also to inputs 118a of exclusive OR gate 118, input 132b of NAND gate 132 and input 134b of OR gate 134. NAND gate 132 thus produces a 1. If the signal S' is 1 at this time, as required for correct transmission, then gate 118 produces a 0, as does AND gate 140. If S' is 0 at this stage, the outputs of XOR gate 118, AND gate 140 and OR gate 142 will go high causing flip-flop 144, and terminal 148, to go high at the next transition.

External recovery circuitry may be used to sense the error indicating signal and take appropriate action. On recovery the outputs of the flip-flops should be reset to the Q0 or Q3 states.

Next, consider the case when a good signal S' is applied to input 110. Again it is assumed, for purposes of explanation that all flip-flops 120, 121 and 122 are set to 0. As described previously, at the first clock pulse a 0 signal is present at input 110, and thus 0's are present at the inputs and outputs of all gates and flip-flops except the output of NAND gate 132 which has a 1 at its output.

On the second clock pulse, S' goes to 1, and AND gate 114 output goes to 1, as does the output of OR gate 117, since only the output of AND gate 114 goes to 1.

The remaining circuitry remains in the same state at this point, but will change on the next clock pulse.

On the third clock pulse, S' goes to 0, and the 1 at the output of OR gate 117 is clocked into flip-flop 120 and appears at its output. Thus the NAND gate input 132a goes to 1, and its output stays at 1. Input 134a of OR gate 134 and its output goes to 1, and the output of AND gate 136 also goes to 1. This then presents a 1 to inputs 114a and 116a of AND gates 114 and 116 respectively.

On the fourth clock pulse, S' goes back to 1. The 1 at the output of flip-flop 120 is clocked to the output of flip flop 121, and also back to flip-flop 120. The output of AND gate 114 remains at 0 and AND gate 116 remains at 1. The outputs of OR gate 134 and NAND gate 132 remain at 1 as does the output of AND gate 136.

On the fifth clock pulse it is assumed that there is no change to S', i.e. it remains at 1. The 1 at the output of flip-flop 121, however, is clocked to the output of flip-flop 122. This signal is applied to terminal 150, indicating a 0 to 1 transition in the decoded output signal S. The inputs of flip-flops 120 and 121 receive 1's, and their outputs stay at 1. The outputs of the remaining circuitry remain the same since there was no change in S'.

Thus the triple transition of S' is correctly decoded into the single transition of the original signal.

While the invention has been described in its preferred embodiments, the words used have been words of description and not limitation. Changes within the purview of the appended claims may be made without departure from the true scope and spirit of the invention in its broader aspects.

We claim:

1. A method for detecting transient errors on a line between a receiver and a transmitter comprising the steps of:

providing an input signal to said transmitter;

generating an output signal at said transmitter having a predetermined number of output transitions in signal level for every input transition in said output signal and providing said output signal to said line;

detecting said output transitions received on said line at said receiver;

generating a single transition at said receiver upon the reception of said predetermined number of transitions at said receiver; and detecting an error and providing a signal indicative thereof upon receipt of less than and more than said predetermined number of transitions.

2. The method according to claim 1 wherein said predetermined number is three.

3. Apparatus for detecting transient errors on a line comprising:

input means coupled to said line for receiving a signal;

encoder means coupled to said input means for generating a predetermined number of output transitions for every transition received thereby and providing an output signal representative thereof;

decoder means for receiving said encoder means output signal and for providing a single transition for every predetermined number of transitions received thereby; and error detection means adapted to receive said encoder means output signal, and for generating an error signal upon receipt of less than and more than said predetermined number of transitions.

4. The apparatus according to claim 3 wherein said predetermined number is three.

5. The apparatus according to claim 4 wherein said encoder means comprises:
first flip flop means coupled to said input means for for receiving a signal therefrom, and for receiving a clock signal, said flip flop means further having an output terminal, and transferring said received signal to said output terminal upon receipt of a clock signal;
second flip flop means coupled to said first flip flop output terminal for receiving a signal therefrom, and for receiving a clock signal, said second flip flop means further having an output terminal, and transferring said received signal to said output terminal upon receipt of a clock signal;
first exclusive OR gate having first and second input terminals and an output terminal, said first input terminal coupled to said input means and said second input terminal coupled to said second flip-flop means output terminal;
second exclusive OR gate having first and second input terminals and an output terminal, said first input terminal coupled to said first exclusive OR gate output terminal and said second input terminal coupled to said first flip-flop means output terminal; and
output means coupled to said second exclusive OR gate output terminal for receiving said encoded signal.

6. The apparatus according to claim 4 wherein said decoder means comprises:
input means for receiving said encoded signal;
first AND gate having an inverting input terminal, and a non-inverting input terminal, and an output terminal,
said non-inverting input terminal being coupled to said input means;
second AND gate having first and second input terminals, and an output terminal;
first OR gate having first and second input terminals and an output terminal, said first OR gate first input terminal being coupled to said first AND gate output terminal, and said first OR gate second input terminal being coupled to said second AND gate output terminal;
first flip-flop means coupled to said first OR gate output terminal, for receiving a signal therefrom, and for receiving a clock signal, said first flip flop means further having an output terminal, and transferring said received signal to said output terminal upon receipt of a clock signal, said second AND gate second input terminal being coupled to said first flip-flop output terminal;
second flip flop means coupled to said first flip flop output terminal for for receiving a signal therefrom, and for receiving a clock signal, said second flip flop means further having an output terminal, and transferring said received signal to said output terminal upon receipt of a clock signal;
third flip-flop means coupled to said second flip flop means output terminal for for receiving a signal therefrom, and for receiving a clock signal, said third flip flop means further having an output terminal, and transferring said received signal to said output terminal upon receipt of a clock signal;
first NAND gate having first, second and third input terminals, and an output terminal, said first input terminal being coupled to said first flip-flop means output terminal, said second input terminal being coupled to said second flip-flop means output terminal, and said third input terminal being coupled to said third flip-flop means output terminal;
second OR gate having first, second and third input terminals, and an output terminal, said first input terminal being coupled to said first flip-flop means output terminal, said second input terminal being coupled to said second flip-flop means output terminal, and said third input terminal being coupled to said third flip-flop means output terminal; and
third AND gate having first and second input terminals, and an output terminal, said first input terminal being coupled to said first NAND gate output terminal and said second input terminal being coupled to said second OR gate output terminal, said third AND gate output terminal being coupled to said first AND gate inverting input and said second AND gate first input terminal;
whereby said decoded output signal is generated at said third flip-flop output terminal.

7. The apparatus according to claim 6 wherein said error detecting means comprises:
exclusive OR gate having first and second input terminals, and an output terminal, said second input terminal being coupled to said input means and said first input terminal being coupled to said second flip-flop means output terminal;
fourth AND gate having first and second input terminals, and an output terminal, said second input terminal being coupled to said exclusive OR gate output terminal, and said fourth AND gate first input terminal being coupled to said third AND gate output terminal;
third OR gate having first and second input terminals and an output terminal, said third OR gate second input terminal being coupled to said fourth AND gate output terminal; and
fourth flip-flop means having an input terminal and an output terminal, said output being coupled to said third OR gate first input terminal, and said fourth flip-flop input terminal being coupled to said third OR gate output terminal;
whereby detection of an error in a signal is indicated at said fourth flip-flop output terminal.

8. Apparatus for detecting transient errors on a signal line between a transmitter and a receiver, in a system having only signal lines between said transmitter and receiver, said apparatus comprising:
input means coupled to said signal line for receiving a signal;
encoder means coupled to said input means for generating a predetermined number of output transitions for every transition received thereby and providing an output signal representative thereof;
decoder means for receiving said encoder means output signal and for providing a single transition for every predetermined number of transitions received thereby; and
error detection means adapted to receive said encoder means output signal, and for generating an error signal upon receipt of less than and more than said predetermined number of transitions.

9. The apparatus according to claim 8 wherein said predetermined number is three.

* * * * *